United States Patent (10) Patent No.: US 7,531,934 B2
Hang et al. (45) Date of Patent: May 12, 2009

(54) SELF-START SYNCHRONOUS MOTOR WITH PERMANENT MAGNETS AND AT LEAST ONE FRICTIONAL AGITATION JOINT, METHOD FOR MANUFACTURING THE SAME AND COMPRESSOR COMPRISING THE SAME

(75) Inventors: Baiying Hang, Shizuoka (JP); Tomio Yoshikawa, Mishima (JP); Yasuro Ohishi, Fujieda (JP); Akeshi Takahashi, Hitachi (JP); Haruo Koharagi, Hitachi (JP)

(73) Assignee: Hitachi Appliances, Inc., Tokyo (JP)

( * ) Notice: Subject to any disclaimer, the term of this patent is extended or adjusted under 35 U.S.C. 154(b) by 397 days.

(21) Appl. No.: 11/439,951

(22) Filed: May 25, 2006

(65) Prior Publication Data

US 2006/0267441 A1 Nov. 30, 2006

(30) Foreign Application Priority Data

May 26, 2005 (JP) ............................. 2005-153698

(51) Int. Cl.
*H02K 21/12* (2006.01)
(52) U.S. Cl. ................................ 310/156.56
(58) Field of Classification Search ................. 310/211, 310/156.53, 42, 216, 156.56, 156.78–156.84; 29/598, 608
See application file for complete search history.

(56) References Cited

U.S. PATENT DOCUMENTS

| 4,564,777 | A | * | 1/1986 | Senoo et al. | ............ | 310/156.81 |
| 4,845,837 | A | * | 7/1989 | Lloyd | ........................... | 29/598 |
| 5,460,317 | A | * | 10/1995 | Thomas et al. | ............ | 228/112.1 |
| 5,813,592 | A | * | 9/1998 | Midling et al. | ............ | 228/112.1 |
| 6,092,277 | A | * | 7/2000 | Beltowski et al. | ............. | 29/598 |
| 6,727,627 | B1 | * | 4/2004 | Sasaki et al. | ................. | 310/211 |
| 7,372,183 | B2 | * | 5/2008 | Sasaki et al. | ............ | 310/156.78 |
| 2003/0062786 | A1 | * | 4/2003 | Reiter et al. | ............ | 310/156.08 |
| 2007/0062026 | A1 | * | 3/2007 | Pizzichil | ....................... | 29/596 |

FOREIGN PATENT DOCUMENTS

| JP | 2001-073948 | 3/2001 |
| JP | 2002-291211 | 10/2002 |
| JP | 2003-289655 | 10/2003 |

* cited by examiner

*Primary Examiner*—Chandrika Prasad
(74) *Attorney, Agent, or Firm*—Antonelli, Terry, Stout & Kraus, LLP.

(57) ABSTRACT

In a method of manufacturing a self-start synchronous motor for preventing deterioration of permanent magnets used in a rotor, and also for enhancing the efficiency of the self-start synchronous motor, the self-start synchronous motor comprising a stator having a stator core and windings wound around the stator core, and a rotor having an outer diameter slightly smaller than an inner diameter of the stator and arranged inside of the stator. The rotor is provided with a rotor core, a plurality of conductor bars embedded in the outer peripheral portion of the rotor core over an entire periphery thereof, end rings provided on opposite end sides of the conductor bars and constituting a squirrel cage conductor in cooperation with the conductor bars, and a plurality of permanent magnets embedded in the rotor core and arranged at a position inner than that of an inner peripheral surface of the conductor bars. Further, the conductor bars and the end rings are electrically and mechanically joined together through frictional agitation joint.

12 Claims, 5 Drawing Sheets

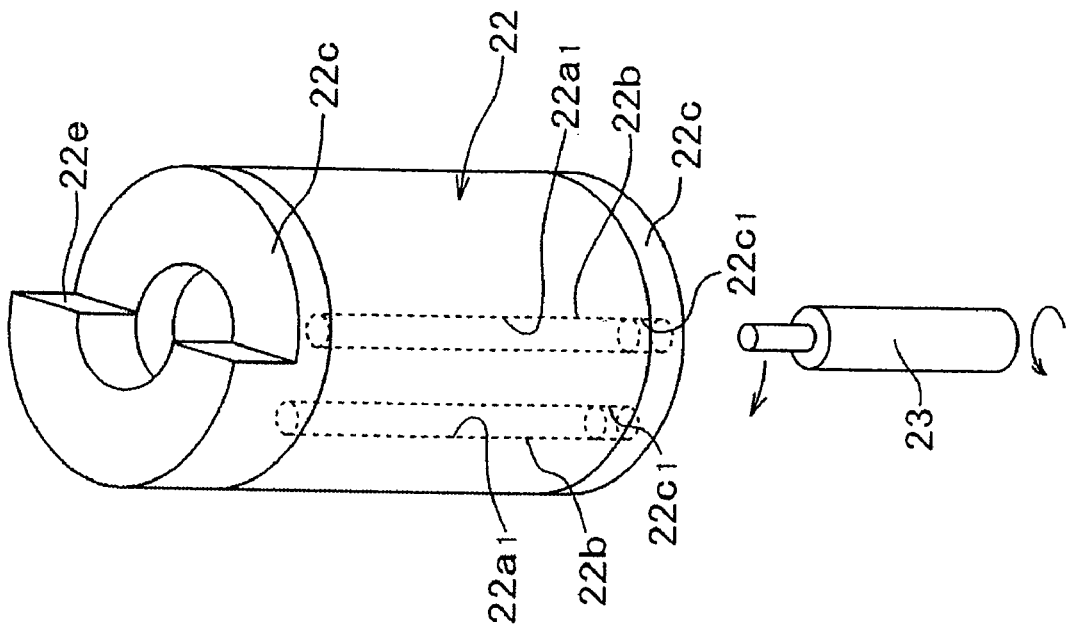
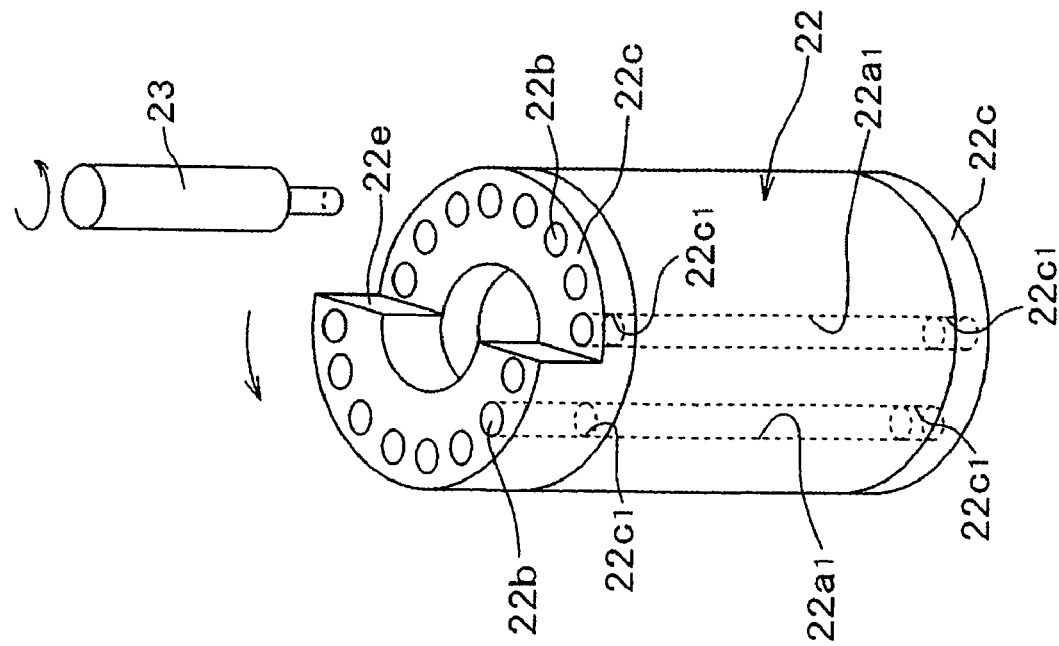

SELF-START SYNCHRONOUS MOTOR WITH PERMANENT MAGNETS AND AT LEAST ONE FRICTIONAL AGITATION JOINT, METHOD FOR MANUFACTURING THE SAME AND COMPRESSOR COMPRISING THE SAME

INCORPORATION BY REFERENCE

The present application claims priority from Japanese application JP 2005-153698 filed on May 26, 2005, the content of which is hereby incorporated by reference into this application.

BACKGROUND OF THE INVENTION

1. Field of the Invention

The present invention relates to a self-start synchronous motor, a method for manufacturing the same and a compressor.

2. Description of Related Art

For example, JP-A-2001-73948 (Patent Document 1) discloses a conventional self-start synchronous motor, which comprises a stator having a stator core and windings wound on the stator core, and a rotor having an outer diameter slightly smaller than that of the inner diameter of the stator and arranged inside of the stator. The rotor is provided with a rotor core, multiple conductor bars circumferentially arranged and embedded in the outer peripheral portion of the rotor core, end rings (short-circuit rings) provided on opposite ends of the conductor bars and forming a squirrel cage conductor in cooperation with the conductor bars, and a plurality of permanent magnets arranged on the inner peripheral side of the conductor bars and embedded in the rotor core. Further, the conductor bars and the end rings are integrally incorporated with each other by aluminum-die-casting.

Meanwhile, for example, JP-A-2002-291211 (Patent Document 2) and JP-A-2003-289655 (Patent Document 3) disclose conventional methods of manufacturing rotors for induction motors.

In the manufacturing method disclosed in the patent document 2, aluminum conductor bars and aluminum end rings are joined together through frictional agitation in order to form a squirrel cage conductor within a rotor core which is composed of silicon steel plates stacked one upon another. This manufacturing method causes no blow holes in the conductor bars and the end rings in comparison with a method in which the conductor bars and the end rings are formed by aluminum die-casting, and accordingly, the rotor can be well-balanced and a satisfied electric performance can be exhibited therefrom.

In the manufacturing method disclosed in the patent document 3, copper conductor bars and copper end rings are joined together through frictional agitation so as to form a squirrel cage conductor within a rotor core. This manufacturing method uses the conductor bars and the end rings, which are made of copper having a low specific resistance, and accordingly, the secondary current resistance can be reduced, and as a result, the rotor loss can be reduced.

However, in the self-start synchronous disclosed in the Patent Document 1, it has been found that the permanent magnets could deteriorate since the conductor bars and the end rings are integrally incorporated with each other by aluminum die-casting and the permanent magnets are subjected to heat at a temperature higher than the melting point (660 deg. C.) of the aluminum material.

Further, in the self-start synchronous motor disclosed in the patent document 1, since the conductor bars and the end rings are made of an aluminum material, the resistance value of the secondary conductor depends upon a specific resistance of the aluminum material and a cross-sectional area and a length of the conductor bars, and accordingly the positions of and the size of the permanent magnets embedded in the secondary conductor at the inner peripheral side are univocally determined, thereby it is difficult to further enhance the efficiency.

In a design, the outer surface areas of the permanent magnets can be increased by arranging the permanent magnets on the outer peripheral side of the rotor, thereby it is possible to enhance the efficiency. Further, should the secondary conductor be formed from a copper material having a specific resistance lower than that of the aluminum material, by copper die-casting, deterioration of permanent magnets would be further accelerated since the melting point of the copper material is extremely high, that is, 1,083 deg. C.

Meanwhile, the patent documents 2 and 3 does not concern a self-start synchronous motor but an induction motors, and fail to disclose or suggest the above-mentioned problems caused in the case of the application of the methods to the self-start synchronous motor.

SUMMARY OF THE INVENTION

An object of the present invention is to provide a self-start synchronous motor which may prevent deterioration of permanent magnets used for a rotor and which has a high degree of efficiency, and a method for manufacturing thereof and a compressor.

To the end, according to a first aspect of the present invention, there is provided a method of manufacturing a self-start synchronous motor including a stator having a stator core and windings wound on the stator core, and a rotor having an outer diameter slightly smaller than an inner diameter of the stator and arranged inside of the stator, the rotor comprising a rotor core; a plurality of conductor bars embedded in an outer peripheral portion of the rotor core over the entire periphery thereof; end rings provided on opposite end sides of the conductor bars and forming a squirrel cage conductor in cooperation with the conductor bars; and a plurality of permanent magnets arranged at positions inner than that of an inner peripheral surface of the conductor bars and embedded in the rotor core, wherein the conductor bars and the end rings are electrically and mechanically joined together through frictional agitation joint with the rotor core embedded therein with the permanent magnets and the conductor bars being interposed between the end rings.

According to the first aspect of the present invention, there are provided the following specific configurations:

(1) the conductor bars and one of the end rings are previously integrally incorporated with one another, and the conductor bars are inserted in the rotor core so as to electrically and mechanically join their free end portions with the other one of the end rings through frictional agitation joint;

(2) the conductor bars and the end rings are made of copper or copper alloy, and a balance weight portion is integrally incorporated with one of the end rings by copper die-casting or copper forging;

(3) the end rings and the conductor bars are joined together through frictional agitation joint from an outer peripheral surface of the end rings in such a condition that the conductor bars are embedded in dovetail groove-like slots formed to open on the outer peripheral surface of the rotor core and dovetail groove-like holes formed on the outer peripheral surface of the end rings;

(4) the conductor bars and one of the end rings are integrally incorporated together by aluminum die-casting, and free end portions of the conductor bars are electrically and mechanically joined to the other one of the end rings which is made of aluminum, through frictional agitation joint; and (5) the conductor bars, one of the end rings and the balance weight are integrally incorporated together by copper die-casting, and free end portions of the conductor bars are electrically and mechanically joined to the other one of the end rings which is made of copper or copper alloy, through frictional agitation joint.

Further, according to a second aspect of the present invention, there is provided a self-start synchronous motor including a stator having a stator core and windings wound around the stator core, and a rotor having an outer diameter slightly smaller than an inner diameter of the stator and arranged inside of the stator, the rotor comprising a rotor core; a plurality of conductor bars embedded in the outer peripheral portion of the rotor core over its entire periphery thereof; end rings provided on opposite end sides of the conductor bars and constituting a squirrel cage conductor in cooperation with the conductor bars; and a plurality of permanent magnets embedded in the rotor core and arranged at a position inner than that of the inner peripheral surface of the conductor bars, wherein the conductor bars and the end rings are electrically and mechanically joined together through frictional agitation joint.

According to a second aspect of the present invention, there is provided a following preferable specific configuration:

(1) the permanent magnets are formed in a circular arc shape, and are arranged in a ring-like shape on the inner side of and in proximity of the plurality of the conductor bars circumferentially arranged.

Further, according to a third aspect of the present invention, there is provided a compressor comprising a compression mechanism portion for sucking thereinto refrigerant, compressing the same and discharging therefrom the refrigerant and a motor portion for driving the compression mechanism, and incorporating a self-start synchronous motor having any one of the abovementioned configuration.

Other objects, features and advantages of the invention will become apparent from the following description of the embodiments of the invention taken in conjunction with the accompanying drawings.

BRIEF DESCRIPTION OF THE SEVERAL VIEWS OF THE DRAWINGS

FIG. 6 is a perspective process view for explaining a method of manufacturing a self-start synchronous motor according to a third embodiment of the present invention;

FIG. 7 is a perspective process view for explaining a method of manufacturing a self-start synchronous motor according to a fourth embodiment of the present invention;

DETAILED DESCRIPTION OF THE INVENTION

Figure 1:
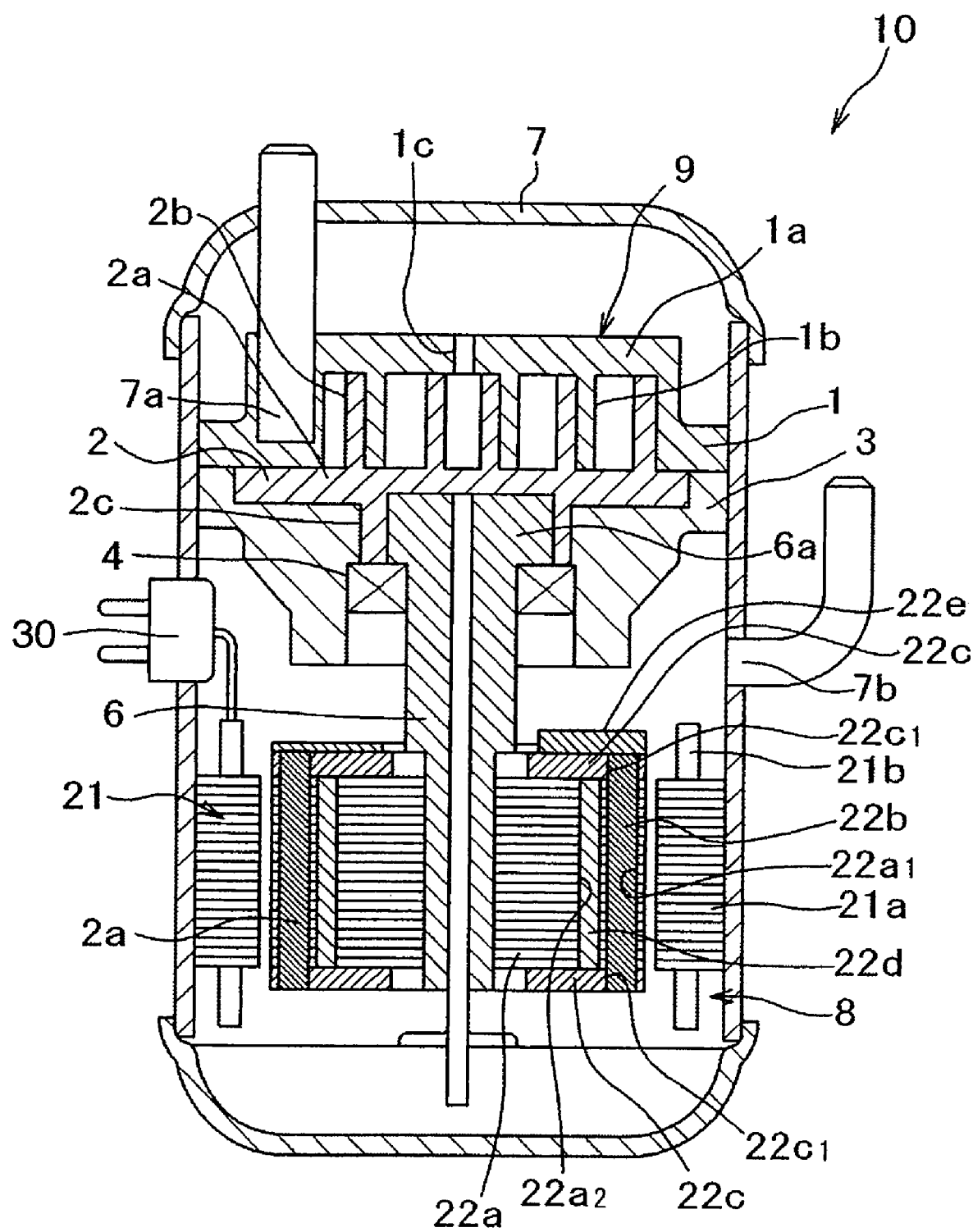
FIG. 1 is a longitudinal sectional view illustrating a compressor which is mounted therein with a self-start synchronous motor according to an embodiment of the present invention.

Explanation will be hereinbelow made of several embodiments according to the present invention with reference to the accompanying drawings, through which like reference numerals are used to denote like parts. It is noted that the configurations of the respective embodiments may be appropriately combined as required so as to exhibit synergetic effects.

Embodiment 1

A self-start synchronous motor, a method of manufacturing thereof and a compressor according to a first embodiment of the present invention will be hereinbelow explained with reference to FIGS. 1 to 4.

First, the overall configuration of a compressor 10 in the first embodiment will be explained with reference to FIG. 1. FIG. 1 is a longitudinal sectional view illustrating a compressor incorporating a self-start synchronous motor in the first embodiment.

A closed container 7 has a sealed structure, enclosing therein a compression mechanism portion 9 composed of a stationary scroll 1, an orbiting scroll 2, a frame 3 and the like, and the self-start synchronous motor 8 composed of a stator 21, a rotor 22 and the like, and a lubricant (which is not shown). The compression mechanism portion 9 and the self-start synchronous motor 8 are arranged up and down. The closed container 7 can bear against a high pressure of compressed fluid (refrigerant gas used for refrigeration cycle of an air-conditioner in this embodiment) which is discharged through a discharge hole 1c in the compression mechanism portion 9.

The stationary scroll 1 which constitutes the compressor 10 is composed of a disk-like end plate 1a, and a spiral lap portion 1b formed upright on the end plate 1a. The end plate 1a is formed in its center portion with the discharge hole 1c. Further, the stationary scroll 1 is fixed to the frame 3 by means of bolts or the like. The frame 3 integrally incorporated with the stationary scroll 1 is fixed to the closed container 7 by means of welding or the like.

The orbiting scroll 2 is composed of a disc-like end plate 2a, a spiral lap portion 2b provided upright on the end plate 2a, and a boss portion 2c provided on the rear side of the end plate 2a at its center. The orbiting scroll 2 is arranged to be combined with the stationary scroll 1, being opposed to each other, and is provided in the frame 3 so as to be turnable.

A drive shaft 6 fixed to the rotor 22 of the self-start synchronous motor 8 is rotatably supported to the frame 3 through the intermediary of a bearing 4, and is coaxial with the axis of the stationary scroll 1. This drive shaft 6 is provided at a distal end with a crank 6a which is eccentric from the axis of the drive shaft 6. The crank 6a is rotatably attached thereto with the boss portion 2c of the orbiting scroll 2 through the intermediary of a swivell bearing. With this configuration, the orbiting scroll 2 has an axis which is eccentric from the axis of the stationary scroll 1 by a predetermined distance, and accordingly, when the drive shaft 6 is rotated, the orbiting scroll 2 carries out orbiting motion.

Due to the orbiting motion of the orbiting scroll 2, a plurality of crescent-shaped compression chambers defined between both lap portions 1b, 2b are displaced toward the center portion so as to continuously decrease their volumes, and are finally communicated with the discharge hole 1c within the center portion and are also communicated with one another.

An intake port 7a constitutes a suction portion for working fluid to be compressed, and is adapted to be communicated with a compression chamber at the outermost periphery. The discharge hole 1c constitutes a discharge portion for compressed working fluid, being formed in the center portion of the end plate 1a of the stationary scroll 1. A discharge port 7b serves as a discharge portion for the compressed working fluid, outside of the closed container 7, and accordingly, is projected outward from the closed container 7.

When the self-start synchronous motor 8 is energized so as to rotate the drive shaft 6, the crank 6a of the drive shaft 6 is eccentrically rotated, and the eccentric rotation of the crank 6a is transmitted to the orbiting scroll 2 through the intermediary of the swivell bearing. As a result, the orbiting scroll 2 is swiveled with a swiveling radius of a predetermined distance around the axis of the stationary scroll 1 as a swiveling center.

According to the swiveling motion of the orbiting scroll 2, the volumes of the compression chambers defined between the lap portions 1b, 2b are continuously decreased as they are displaced to the center portion so as to successively compress the working fluid sucked from the suction port 7a, and accordingly, the working fluid which has been compressed up to a predetermined pressure is discharged into the closed container 7 from the discharge hole 1c. The discharge working fluid flows around the stator 8a and the rotor 8b and is filled in the closed container 7 in its entirety. The working fluid in the closed container 7 is led to a refrigerating cycle outside of the closed container 7 through the discharge port 7b. Windings wound on the stator 21 are fed thereto with current from the power source socket 30.

Figure 2:
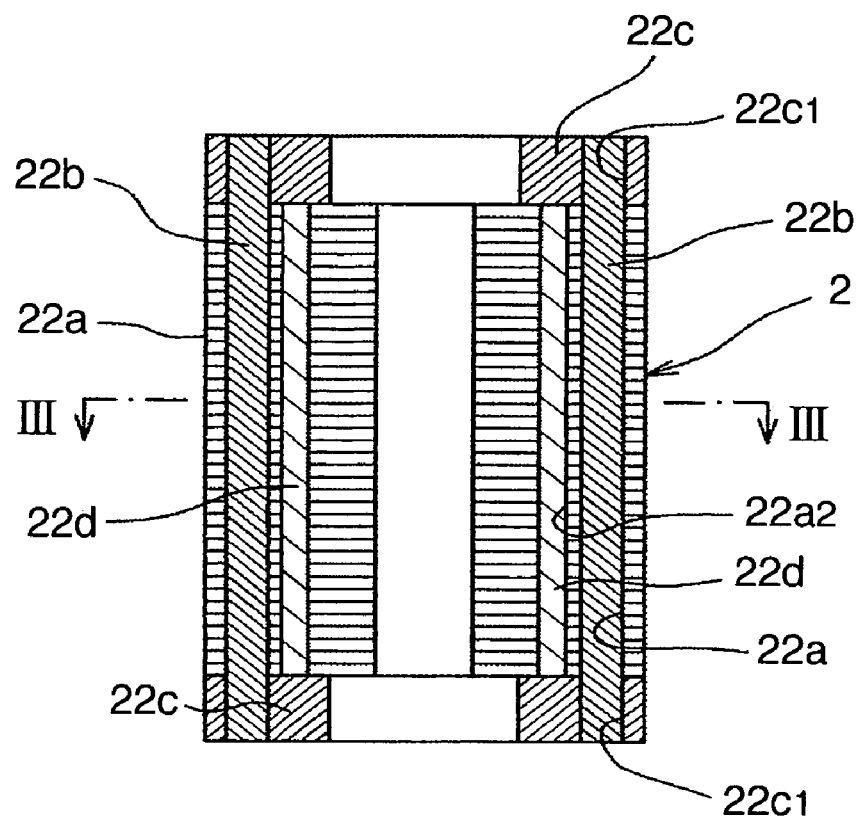
FIG. 2 is a sectional view illustrating a rotor of the self-start synchronous motor mounted in the compressor shown in FIG. 1.
Figure 3:
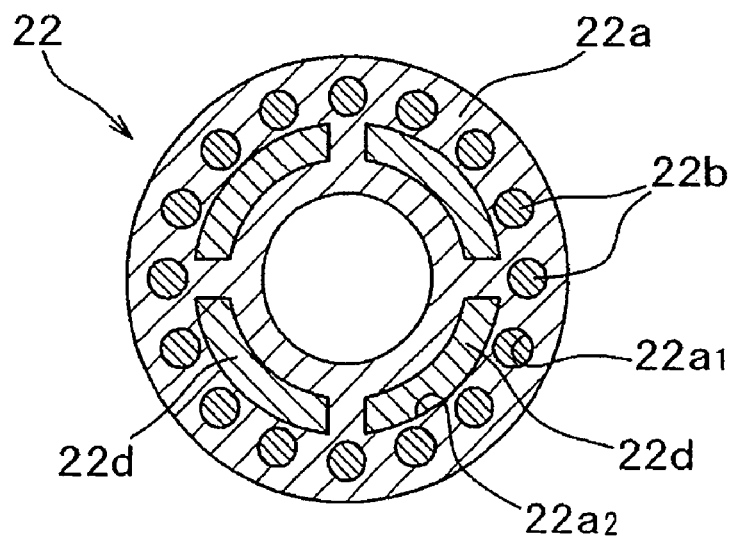
FIG. 3 is a sectional view taken along a III-III line in FIG. 2.
Figure 4:
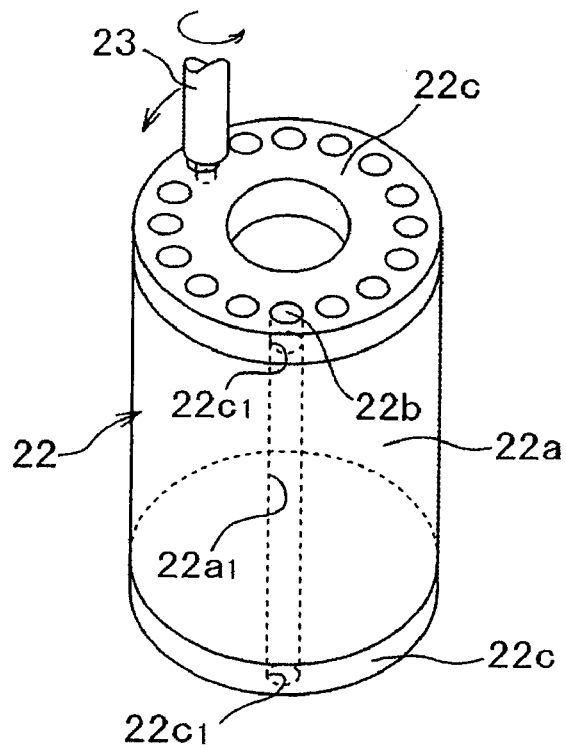
FIG. 4 is a perspective view for explaining a method of manufacturing the rotor shown in FIG. 2.

Next, explanation will be made of the configuration of the self-start synchronous motor 8 with reference to FIGS. 1 to 4. FIG. 2 is a sectional view illustrating the rotor 22 of the self-start synchronous motor 8 mounted on the compressor in FIG. 1, FIG. 3 is a sectional view taken along a III-III line in FIG. 2, and FIG. 4 is a perspective view for explaining a method of manufacturing the rotor shown in FIG. 2. It is noted here that FIGS. 2 to 4 show the rotor 22 before a balance weight 22e is mounted thereon.

The self-start synchronous motor 8 comprises the stator 21 composed of a stator core 21a and windings 21b wound on the stator core 21a, and the rotor 22 having an outer diameter slightly smaller than the inner diameter of the stator 21 and arranged inside of the stator 21. This self-start synchronous motor 8 is operated as an induction motor upon starting by means of a secondary squirrel cage conductor, and is taken into a synchronous speed at promote the synchronous speed so as to be operated at the synchronized speed.

The rotor 22 is composed of a rotor core 22a, a plurality of conductor bars 22b embedded in the outer peripheral portion of the rotor core 22a over its entire circumference, end rings 22c of aluminum provided on opposite end sides of the conductor bars 22b so as to form a squirrel cage conductor in cooperation with the conductor bars 22b, a plurality of permanent magnets 22d (for example, neodymium group magnets) embedded in the rotor core 22a at a position inner than the position of the inner peripheral surface of the conductor bars 22b and a balance weight 22e attached to one of the end rings 22c.

The rotor core 22a is composed of a laminated core and is formed therein with several circular slots 22a1 for embedding the conductor bars 22b, at equal intervals, over its entire circumference. These circular slots 22a1 are opened at opposite surfaces of the rotor core 22a.

The conductor bars 22b are composed of columnar bodies having an outer diameter substantially equal to the diameter of the circular slots 22a1 and is made of aluminum materials, having a length substantially equal to the sum of the length of the rotor core 22a and the lengths of the both side end rings 22c. These conductor bars 22b are extended through the circular slots 22a1 of the rotor core 22a and embedded therein, and are also extended into circular holes 22c1 in the end rings 22c and embedded.

The end ring 22c has an outer diameter equal to the outer diameter of the rotor core 22a, and is formed therein with circular holes 22c1 over its entire circumference corresponding to the circular slots 22a1 of the rotor core 22a. Holes in the end rings 22c have the same shape as that of slots of the stationary core 22a, and accordingly, the conductor bars 22b may have a simple shape with the same diameter, that is, it may be simply and inexpensively manufactured by cutting a long rod. It is noted that the conductor bars 22b may be tapered at its opposite end portions while the diameter of the circular holes 22c1 of the end rings 22c is set to be smaller than that of the circular holes 22a1 of the rotor cores 22a in order to give preference to the assembling ability.

The permanent magnets 22d which are formed in a circular arc shape are arranged circularly on the inside of and in proximity of the circumferentially arranged several conductor bars 22b. With this configuration, the magnetic power of the permanent magnets 22d may be intensified so as to enhance the performance of the motor. In this embodiment, four circular arc shape permanent magnets 22d are arranged circularly. Further, the permanent magnets 22d are embedded in circular arc slots 22a2 in the rotor core 22a, having opposite end faces exposed from the rotor core 22a but covered with the end rings 22c.

A balance weight 22e is adapted to balance the motor so as to eliminate unbalance exerted to the motor, and is made of iron materials. The balance weight 22e has an outer diameter equal to those of the end rings 22c and the rotor core 22a, and is attached to the outer surface of one of the end rings 22c.

Next, explanation will be made of a method of manufacturing the self-start synchronous motor 8 with reference to FIGS. 1 to 4.

At first, the conductor bars 22b and the permanent magnets 22d are embedded in the circular slots 22a1 and the circular ark slots 22a2 in the rotor core 22a. At this embedded condition, the opposite end faces of the permanent magnets 22d are flush with the opposite end faces of the rotor core 22a, but the opposite end portions of the conductor bars 22b are projected from the opposite end faces of the rotor core 22a.

Next, the end rings 22c are superposed on the rotor core 22a at opposite end sides thereof so that the projected portions of the conductor bars 22b on opposite end sides thereof are embedded in the holes in the end rings 22c, the rotor core 22a being interposed between the end rings 22c. At this stage, the opposite-end faces of the permanent magnets 22d are made into contact with the end rings 22c so as to be covered therewith. Meanwhile, opposite end faces of the conductor bars 22b are flush with the outer surfaces of the end rings 22c, and are exposed from the holes in the end rings 22c.

It is noted that after only the permanent magnets 22d are embedded in the circular arc slots 22a2 in the rotor core 22a, the conductor bars 22d may be embedded in the holes of the end rings 22e and the circular slots 22a1 of the rotor core 22a in such a condition that the end rings 22c are superposed on the rotor core 22a.

Then, as shown in FIG. 4, with the use of a joint tool 23, the conductor bar 22b and the end rings 22c is joined to each other under frictional agitation so as to form a squirrel cage conductor. That is, the distal end portion of the joint tool 23 is a rod-like rotary tool made of a metal material (for example, molybdenum) having a hardness higher than that of aluminum, and accordingly, the joint tool 23 rotated at a high speed is moved along the periphery of the conductor bars 22b while it is pressed against a joint zone between the conductor bar 22b and the end ring 22c (in other words, the joint tool is moved around concentrically with the center of the rotor 22 in the vicinity of the centers of the conductor bars 22b). Thus, a heat generated by a friction among the joint toll 23, the conductor bar 22b and the end ring 22c raises the temperature around the joint portion up to a temperature not lower than the melting point 660 deg. C. of the conductor bar 22b and the end ring 22c, and the joint portion of the conductor bar 22b and the end ring 22c are softened so as to cause plastic flow. After removal of the joint tool 23, they are cooled. Thus, the conductor bars 22b and the end rings 22c are agitated and joined together. With this joint method, the temperature of the joint portions may be locally raised, and accordingly, it is possible to prevent the permanent magnets 22d from deteriorating.

The above-mentioned frictional agitation join is applied to the end rings 22c on opposite end sides, and then, the balance weight 22e is superposed on and attached to the end ring 22c as shown in FIG. 1.

Second Embodiment

Figure 5A:
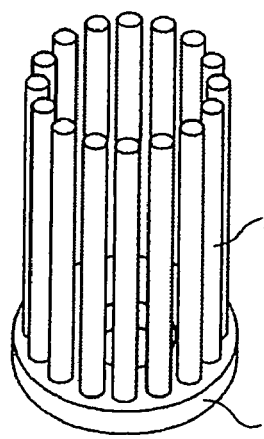
FIGS. 5A to 5C are perspective process views for explaining a self-start synchronous motor according to a second embodiment of the present invention.
Figure 5B:
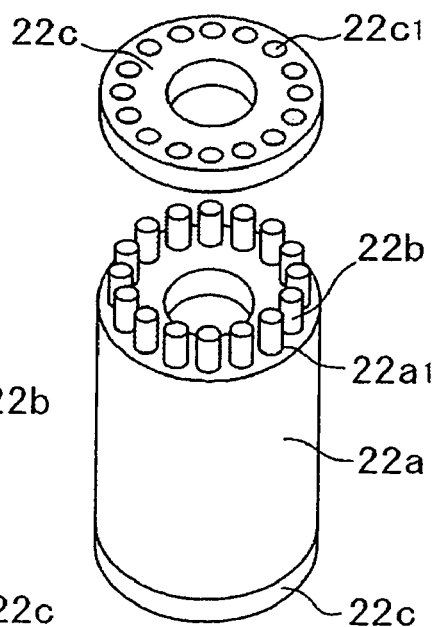
Figure 5C:
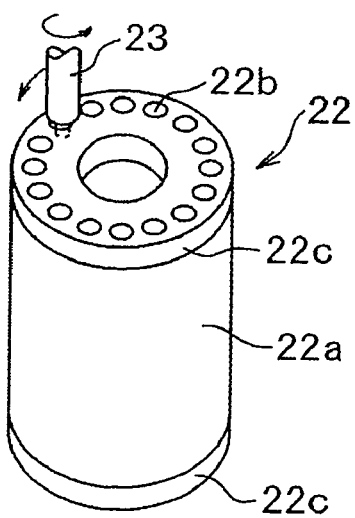

Next, explanation will be made of a second embodiment according to the present invention with reference to FIGS. 5A to 5C. FIGS. 5A to 5C are perspective process views for explaining a method of manufacturing a self-start synchronous motor according to the second embodiment of the present invention. The configuration of the second embodiment is basically the same as that of the first embodiment, except those which will be explained hereinbelow. Thus, explanation duplicated with that of the first embodiment will be omitted.

In the second embodiment, at first, as shown in FIG. 5a, the conductor bars 22b and one of the end rings 22c are previously integrally incorporated with each other. Then, as shown in FIG. 5B, the conductor bars 22b of the thus integrally incorporated product are inserted through the circular slits 22a1 of the rotor core 22a, allowing the free end portions thereof to project from an end face of the rotor core 22a, and the projected portions of the conductor bars 22b are embedded in the circular slots 22c1 of the end ring 22c. Then, as shown in FIG. 5C, frictional agitation joint is carried out to the joined portion with the use of the joint tool 23, similar to the first embodiment, and accordingly, the conductor bars 22b and the end rings 22c are electrically and mechanically joined together.

According to the second embodiment, since the conductor bars 22b and one of the end rings 22c are previously joined together, only one step of frictional agitation step is required, thereby it is possible to reduce the number of production steps and to enhance the production efficiency.

It is noted that a method of previously integrally incorporating the conductor bars 22b with one of the end rings 22c may be carried out by aluminum die-casting or aluminum forging without deteriorating the permanent magnets. In this case, the aluminum die-casting is preferable in view its reliability since its operating experience is plentiful.

Third Embodiment

Next, explanation will be made of a third embodiment according to the present invention with reference to FIG. 6. FIG. 6 is a perspective process view for explaining a method of manufacturing a self-start synchronous motor according to the third embodiment of the present invention. The configuration of the third embodiment is basically the same as that of the first embodiment, except those which will be explained hereinbelow. Thus, explanation duplicated with that of the first embodiment will be omitted.

In the third embodiment, the conductor bars 22b and end rings 22c are made of copper or copper alloy, and the balance weight portion 22e is integrally incorporated with the end ring 22c by means copper die-casting or copper forging. Further, with the preparation of conductor bars having two different lengths, the end faces of the conductor bars 22b are exposed flush with the outer surface of the balance weight portion 22e and the outer surface of the end ring 22c where the balance weight portion 22e is not provided, and as shown in FIG. 6, the end ring 22c and the conductor bars 22b are joined together with the use of the joint tool 23. A stepped portion by the balance weight portion 22e can be adjusted by controlling the height of the joint tool 23.

With the configuration of the third embodiment in which the secondary squirrel cage conductor may be made of copper materials having a specific resistance which is lower than that of the aluminum, the loss of the secondary squirrel cage conductor may be reduced, thereby it is possible to enhance the motor efficiency. In particular, the self-start synchronous motor 8 operates as an induction motor according to the secondary squirrel cage conductor during a start, then is operated being taken into a synchronous speed on the point near the synchronous speed, and finally operated at the synchronous speed. With the equal diameter of the secondary squirrel cage conductor, the secondary resistance may be decreased by using a copper material instead of an aluminum material, and accordingly, a torque on the point near the synchronous speed becomes larger, and there may be offered such an advantage that the ability of take-in into the synchronous speed is improved. Further, since the copper conductor bars 22b are made to be thin in diameter so as to make the resistance value of the secondary squirrel conductor equal to that of the aluminum conductor, the circular arc slots 22a2 in which the permanent magnets 22d are inserted, may arranged adjacent to the outer peripheral portion of the rotor 22. Thus, the outer surface areas of the permanent magnets 22d may be increased, and accordingly, it is possible to enhance the efficiency of the motor. Further, since the end rings 22c are made of a copper material instead of aluminum material, the axial length of the end rings 22c may be decreased, thereby it is possible to miniaturize the motor.

Further, in the case of operation of the self-start synchronous motor 8 coupled with a load through the intermediary of the drive shaft 6, should the rotational center of gravity of the load be eccentric from the center of the drive shaft of the motor, that is, the rotational balance be broken, the motor would cause vibration and noise, resulting in a failure of exhibition of its normal performance. Thus, the provision of the balance weight 22e is required in order to eliminate the total moment in the radial direction of the rotor 22. In the first embodiment, since the end rings 22c made of an aluminum material having a small specific weight is used, it is required to manufacture the end ring 22c and the balance weight 22e respectively from different members, as shown in FIG. 1.

In the third embodiment, since the end ring 22c is made of a copper material, the end ring 22c and the balance weight 22e may be formed from a common member, being integrally incorporated with each other. Thus, the end ring 22c and the balance weight 22e may be formed by a single process step, and accordingly, the number of production steps may be reduced, thereby it is possible to enhance the production efficiency. It is noted here that the self-start synchronous motor may be miniaturized in comparison with a motor utilizing balance weight 22e made of aluminum or iron material since the specific weight of the copper material is heavier than that of the iron material.

Fourth Embodiment

Next, explanation will be hereinbelow made of a fourth embodiment according to the present invention with reference to FIG. 7 which is a perspective view for explaining a method of manufacturing a self-start synchronous motor according to the fourth embodiment of the present invention. The configuration of the fourth embodiment is basically the same as that of the third embodiment, except those which will be explained hereinbelow. Thus, the explanation duplicated with that of the third embodiment will be omitted.

In the fourth embodiment, the conductor bars 22b, one of the end rings 22c and the balance weight 22e are integrally incorporated with one another by copper die-casting, and the free end portions of the conductor bars 22b are electrically and mechanically joined to the other one of the end rings 22c made of cupper or cupper alloy by frictional agitation joint.

With the configuration of this fourth embodiment, the technical effects in combination between the second and third embodiment may be exhibited, thereby it is possible to aim at remarkably enhancing the productivity.

Fifth Embodiment

Figure 8:
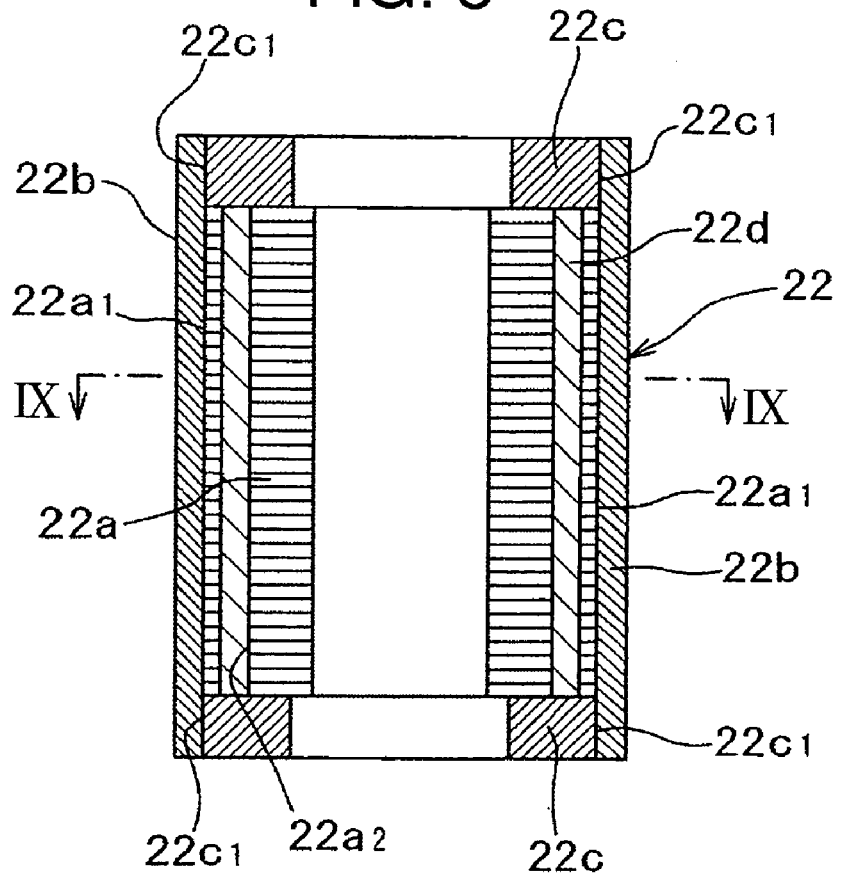
FIG. 8 is a sectional view showing a rotor of a self-start synchronous motor according to a fifth embodiment of the present invention.
Figure 9:
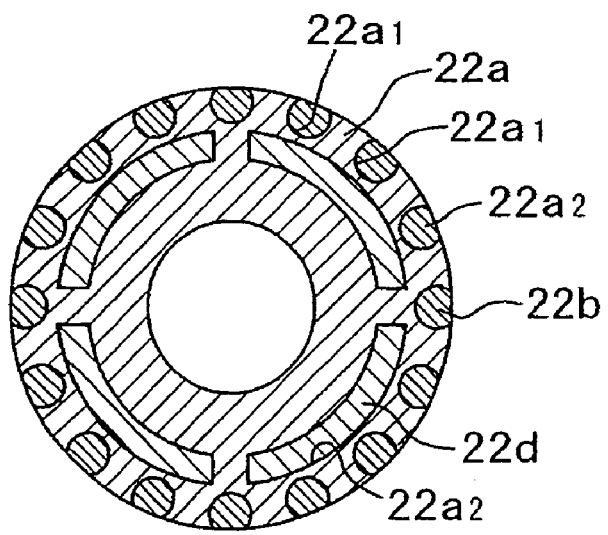
FIG. 9 is a sectional view taken along a IX-IX line in FIG. 8.

Next, explanation will be hereinbelow made of a fifth embodiment according to the present invention with reference to FIGS. 8 and 9. FIG. 8 is a sectional view illustrating a rotor of a self-start synchronous motor according to the fifth embodiment of the present invention, and FIG. 9 is a sectional view taken along a IX-IX line in FIG. 8. The configuration of the fifth embodiment is basically the same as that of the first embodiment, except those which will be explainer hereinbelow. Thus, explanation duplicated with that in the first embodiment will be omitted.

In the fifth embodiment, the conductor bars 22b are embedded in dovetail groove-like slots 22a1 which are formed open in the outer peripheral surfaces of the rotor core 22a, and in dovetail groove-like holes 22c1 formed in the outer peripheral surface of the end rings 22c, and thereafter the end rings 22c and the conductor bars 22b are joined to each other by frictional agitation joint from the outer peripheral sides of the end rings 22c.

With the configuration of the fifth embodiment, the conductor bars 22b may be arranged adjacent to the outer peripheral portion of the rotor 22, and accordingly, the circular arc slots 22a2 into which the permanent magnets 22d are inserted may be arranged near to the outer peripheral portion of the rotor 22. The outer surface areas of the permanent magnets 22d may be remarkably increased. Thereby it is possible to greatly enhance the motor efficiency.

According to the present invention, the permanent magnets used in the rotor may be prevented from deteriorating, and there may be provided a self-start synchronous motor with a high degree of efficiency, the method manufacturing thereof and the compressor.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method of manufacturing a self-start synchronous motor comprising the steps of:
    forming a stator having a stator core and windings wound on said stator core, and
    forming a rotor having an outer diameter slightly smaller than an inner diameter of said stator and arranged inside of said stator, said rotor being formed with a rotor core;
    embedding a plurality of conductor bars in an outer peripheral portion of said rotor core over an entire periphery thereof;
    providing end rings on opposite end sides of said conductor bars and forming a squirrel cage conductor in cooperation with said conductor bars;
    embedding a plurality of permanent magnets in said rotor core at positions inside of an inner peripheral surface of said conductor bars so that said permanent magnets are positioned closer to an axis of said rotor than a position of said inner peripheral surface of said conductor bars to said axis; and
    forming at least one frictional agitation joined between said conductor bars and said end rings so as to electrically and mechanically frictionally bond said conductor bars and said end rings together through said at least one frictional agitation joint;
    wherein said conductor bars are interposed between said end rings and a balance weight is attached to one of the end rings.

2. A method of manufacturing a self-start synchronous motor as set forth in claim 1, wherein
    said conductor bars and one of said end rings are previously integrally incorporated with one another, and
    said conductor bars are inserted in the rotor core so as to electrically and mechanically join their free end portions with the other one of said end rings through said at least one frictional agitation joint.

3. A method of manufacturing a self-start synchronous motor as set forth in claim 1, wherein
    said conductor bars and said end rings are made of copper or copper alloy, and
    the balance weight portion is integrally incorporated with the one of said end rings by copper die-casting or copper forging.

4. A method of manufacturing a self-start synchronous motor as set forth in claim 1, wherein said end rings and said conductor bars are joined together through said at least one frictional agitation joint from an outer peripheral surface of said end rings in such a condition that said conductor bars are embedded in dovetail groove-like slots formed to open on an outer peripheral surface of said rotor core, and in dovetail groove-like holes formed on the outer peripheral surface of said end rings.

5. A method of manufacturing a self-start synchronous motor as set forth in claim 2, wherein
    said conductor bars and one of said end rings are integrally incorporated together by aluminum die-casting, and free end portions of said conductor bars are electrically and mechanically joined to the other one of said end rings which is made of aluminum, through said at least one frictional agitation joint.

6. A method of manufacturing a self-start synchronous motor as set forth in claim 3, wherein said conductor bars, one of said end rings and a balance weight are integrally incorporated together by copper die-casting, and free end portions of said conductor bars are electrically and mechanically joined to the other one of said end rings which is made of copper or copper alloy, through said at least one frictional agitation joint.

7. A self-start synchronous motor comprising:

a stator having a stator core and windings wound around said stator core, and a rotor having an outer diameter slightly smaller than an inner diameter of said stator and arranged inside of said stator, said rotor comprising a rotor core;

a plurality of conductor bars embedded in the outer peripheral portion of the rotor core over an entire periphery thereof;

end rings provided on opposite end sides of said conductor bars and constituting a squirrel cage conductor in cooperation with said conductor bars; and a plurality of permanent magnets embedded in said rotor core and arranged at position inside of an inner peripheral surface of said conductor bars so that said permanent magnets are positioned closer to an axis of said rotor than a position of said inner peripheral surface of said conductor bars to said axis; and at least one frictional agitation joint electrically and mechanically frictionally bonds together said conductor bars and said end rings;

wherein said conductor bars are interposed between said end rings and a balance weight is attached to one of the end rings.

8. A self-start synchronous motor as set forth in claim 7, wherein said permanent magnets are formed in a circular arc shape, and are arranged in a ring-like shape on an inner side of, and in proximity of, said plurality of said conductor bars circumferentially arranged.

9. A compressor comprising:

a compression mechanism portion for sucking thereinto refrigerant, compressing the same and discharging therefrom the refrigerant, and a motor portion for driving said compression mechanism portion, wherein said motor portion comprises a stator having a stator core and windings wound around said stator core, and a rotor having an outer diameter slightly smaller than an inner diameter of said stator and arranged inside of said stator, said rotor provided with a rotor core, a plurality of conductor bars embedded in an outer peripheral portion of said rotor core over an entire periphery thereof, end rings provided on opposite end sides of said conductor bars and constituting a squirrel cage conductor in cooperation with said conductor bars, and a plurality of permanent magnets embedded in said rotor core and arranged at a position inside of an inner peripheral surface of said conductor bars so that said permanent magnets are positioned closer to an axis of said rotor than a position of said inner peripheral surface of said conductor bars to said axis; and at least one frictional agitation joint electrically and mechanically frictionally bonds together said conductor bars and said end rings;

wherein said conductor bars are interposed between said end rings.

10. A method of manufacturing a self-start synchronous motor as set forth in claim 1, wherein the step of electrically and mechanically frictionally bonding together said conductor bars and said end rings includes rotating a joint tool pressed against said conductor bars and said end rings, so as to form said at least one frictional agitation joint.

11. A method of manufacturing a self-start synchronous motor as set forth in claim 1, further comprising the step of attaching said self-start synchronous motor to a compressor which sucks a refrigerant thereinto, compresses said refrigeration and discharges said refrigerant therefrom.

12. A self-start synchronous motor as set forth in claim 7, wherein said self-start synchronism motor forms a part of a compressor which sucks thereinto a refrigerant, compresses said refrigerant, and discharging said refrigerant therefrom.

* * * * *